C. DE W. WAGNER.
SHEET METAL SHEARS.
APPLICATION FILED FEB. 3, 1909.
935,072.
Patented Sept. 28, 1909.
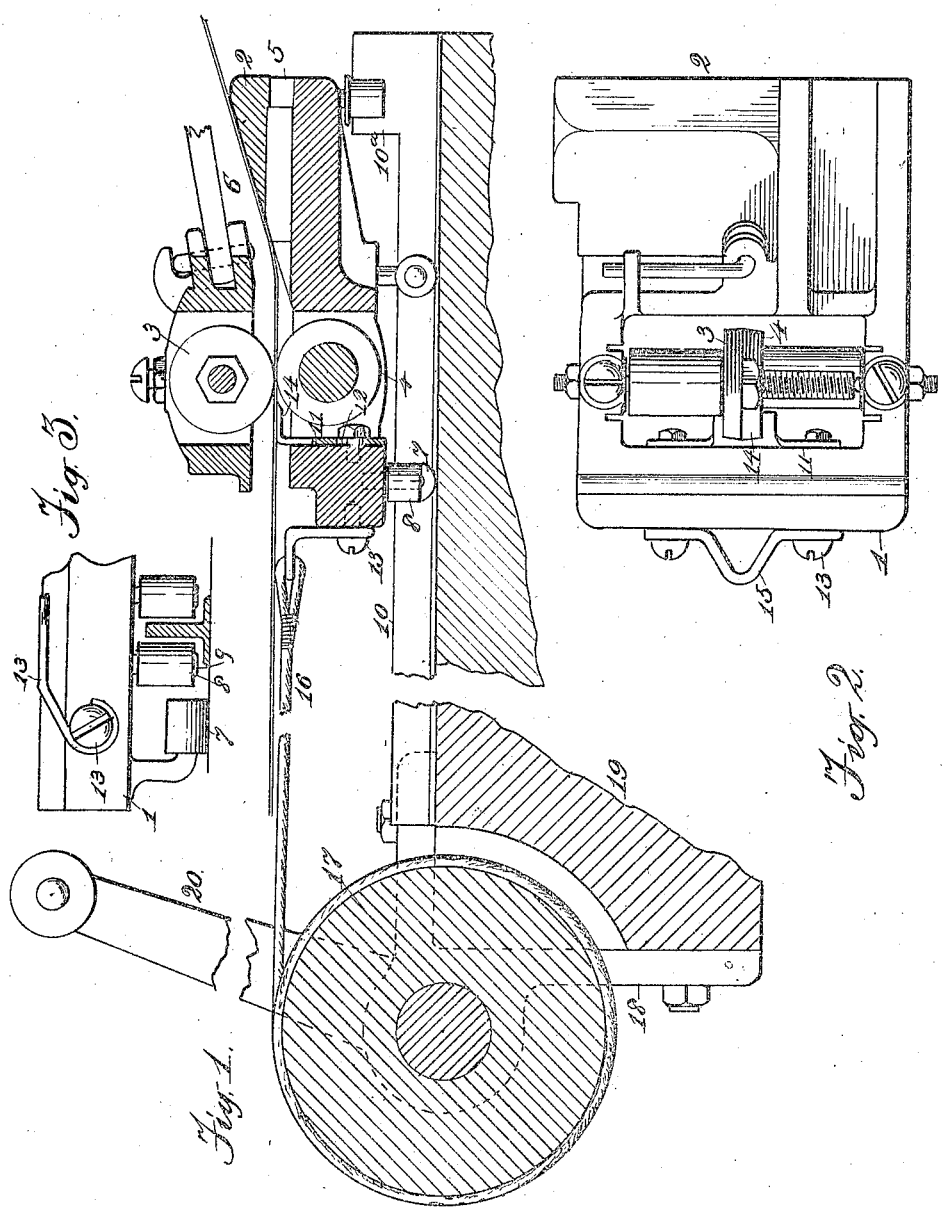

UNITED STATES PATENT OFFICE.

CLINTON DE WITT WAGNER, OF CEDAR RAPIDS, IOWA.

SHEET-METAL SHEARS.

935,072.

Specification of Letters Patent. Patented Sept. 28, 1909.

Application filed February 3, 1909. Serial No. 475,935.

*To all whom it may concern:*

Be it known that I, CLINTON DE WITT WAGNER, a citizen of the United States, residing at Cedar Rapids, in the county of Linn and State of Iowa, have invented certain new and useful Improvements in Sheet-Metal Shears, of which the following is a specification.

This invention relates to shears used for cutting sheet metal, and more particularly the type of shears described in Letters Patent No. 801,697, granted to me on October 10th, 1905.

In the patent above referred to the device was more especially adapted for the cutting of curved forms, such, for example, as are used in the manufacture of elbows for furnace pipe and the like, and showed means for operating the shears from behind, that is to say, the shears were pushed forward by the operator.

This invention embraces among other improvements means for drawing the shears forward, whereby they are adapted to cut much heavier material than would be possible by pushing the shears forward by hand.

The full nature of the invention will clearly appear from the description and claims following, reference being had to the accompanying drawing in which—

Figure 1 is a sectional view of a device embodying my improvements in a line central to Fig. 2. Fig. 2 is a top view of the shears detached from any actuating mechanism. Fig. 3 is a fragmentary view illustrating the front end of the lower portion of the shears and a section of guide track adapted to coöperate therewith.

In the main the shears themselves do not differ essentially from those described in said former patent, and may briefly be described as follows:—1 and 2 are the halves of a rectangular frame, near the forward end of which is mounted a pair of rotary cutters, 3 and 4 respectively. 5 and 6 are throats in the back parts of the frames, through which the slit material may pass, thus permitting the entire shears to traverse a sheet of metal of any width. To the bottom of the frame 1 are attached rollers 7, adapted to travel on the top of a work bench or form. Near the front end of this part of the shears is also mounted a pair of rollers 8, on vertical axes 9, adapted to straddle a vertical form or guide strip 10. This guide, in the case of elbow work and the like, is necessarily curved, and in following it the desired shapes are accurately cut by the rotary cutters trailing a little in the rear of said guide rollers. In practice it has been found unnecessary to employ a double set of guide rollers in front, as was shown in said former patent, the single pair herein shown serving every practical purpose.

In said former patent was shown a pair of short guide ribs to engage a pair of rollers at the rear, similar to the guide rollers in front. One part of my improvement relates to this feature and is clearly shown in Fig. 1. Instead of the outlying guide ribs the single rib 10 is extended upwardly at 10ᴬ and the guide rollers engaging therewith are set relatively higher than the front guide rollers so that after passing the extension these rollers are entirely free from the guide and do not interfere with the action of the shears, whether the guide be straight or curved. The purpose of this auxiliary guide is to insure accurate initial alinement. It is very essential in starting the cut at the edge of a sheet that it be accurately placed, otherwise the shears will be more or less crowded out of their proper place and the work be inaccurately cut. Once it is properly started, however, the shears follow the guide and cut the blank as true to proper shape as could be done by ordinary hand shears. In the hands of a careful workman the auxiliary guide at the rear might be dispensed with, but for ordinary use it is desirable, for reasons above noted.

Another improvement refers to a support for the sheet, just in advance of the cutters. To insure the best results it is desirable to support the metal just in advance of the cutters and at just such a height with reference to their cutting edges that the cut may be made clean and without any raggedness on either side. The nature of this support 11 is shown in Fig. 1 and it will be seen to consist of a simple plate with slotted holes at 12 to take the bolts 13 by which it is fastened to the lower frame 1. The upper end of the support 14 turns inwardly toward the cutters and forms a resting place for the sheets just in advance thereof. The slotted bolt holes admit of accurate adjustment, so that as the cutters wear and are ground smaller in diameter this support may be correspondingly lowered and the accurate placing of the sheet thereby insured.

Another improvement refers to means whereby the shears may be drawn forward instead of being pushed. The attachment for this purpose consists of a simple loop or bracket 15 which in practice may be of stout wire bent to suitable form and fastened to the front end of the frame by the bolts 13. To this loop may be attached any suitable pulling device, such as small wire cable 16, and this is preferably wound on a drum or windlass 17, mounted to revolve in suitable bearings 18 attached to the bench 19 and turned by a crank 20. By this means the shears may be operated to slit quite heavy material, and of practically any width or length desired. In practice it is used mainly in slitting sheets lengthwise and in straight lines, and is found very useful in so slitting material which is too long to be cut by the ordinary squaring shears, the operation being performed both more rapidly and accurately than can ordinarily be done by means of hand shears. It is also much more convenient, since the parent sheet may be suitably clamped to the bench at the proper level, and then without any marking, and by a mere turning of the crank, the sheet may be slit to any desired width or length.

Having thus described my invention I claim:

1. In a sheet metal shear, and in combination with upper and lower frames adapted to permit the sheet to pass through them at the rear, a pair of rotary cutters mounted in said frames, supporting foot rollers thereunder, a pair of guide rollers near the front end, a pair of guide rollers at the back end set higher than the forward pair, and a guide to be straddled by said rollers, the guide being provided at one end with an upward extension, or auxiliary short guide, substantially as described.

2. In a sheet metal shear having frames adapted to permit the slit material to pass entirely between them, and provided with a pair of slitting cutters, an adjustable sheet support mounted in front of said cutters, and suitable means for attaching it adjustably to the lower frame.

3. In a sheet metal shear, and in combination with frames adapted to permit the slit material to pass entirely between them and slitting cutters mounted in said frames, a loop or the like attached to one of said frames, whereby the shears may be drawn across the sheet from in front.

4. The combination of sheet metal shears, comprising frames adapted to permit the sheet to pass entirely between them and provided with a pair of slitting cutters, a loop or the like on one of said frames, a pulling device such as a cable or the like connecting therewith, and a windlass adapted to draw the shears across a sheet substantially as described.

In testimony whereof I affix my signature in presence of two witnesses.

CLINTON DE WITT WAGNER.

Witnesses:
 J. M. St. John,
 Robt. S. Zollinger.